United States Patent [19]

Rode

[11] Patent Number: 5,402,560
[45] Date of Patent: Apr. 4, 1995

[54] BEARING SETTING APPARATUS
[75] Inventor: John E. Rode, Fonda, N.Y.
[73] Assignee: Temper Corporation, Fonda, N.Y.
[21] Appl. No.: 145,750
[22] Filed: Oct. 29, 1993
[51] Int. Cl.[6] .................................................. B23P 19/04
[52] U.S. Cl. ........................................ 29/252; 29/282
[58] Field of Search ............... 254/29 A; 29/252, 263, 29/280, 282, 238

[56] References Cited

U.S. PATENT DOCUMENTS

| | | | |
|---|---|---|---|
| 3,774,896 | 11/1973 | Rode . | |
| 3,986,241 | 10/1976 | Ruppe | 29/252 |
| 4,067,585 | 1/1978 | Rode . | |
| 4,125,929 | 11/1978 | Rode . | |
| 4,129,931 | 12/1978 | Carrigan | 29/252 |
| 4,485,542 | 12/1984 | Vasoll | 29/252 |
| 4,646,411 | 3/1987 | Hankins | 29/252 |
| 4,846,444 | 7/1989 | Vassalotti | 254/29 A |
| 5,058,424 | 10/1991 | O'Hara | 29/252 |

*Primary Examiner*—Robert C. Watson
*Attorney, Agent, or Firm*—Heslin & Rothenberg

[57] ABSTRACT

A bearing setting apparatus for a pair of bearings mounted on a spindle or an axle. Mounted on the spindle or axle are two bearings, each having an inner bearing race. Interposed between the inner bearing races is an adjustable spacer. A mechanism is employed for adjusting the bearings and collapsing the spacer such that a desired bearing tension is provided. In particular, the mechanism includes a piston extension which engages one of the inner bearing races when hydraulic pressure is applied to the piston extension. By applying the pressure, one of the inner bearing races moves closer to the other causing the adjustable spacer to collapse such that a desired bearing tension is provided.

9 Claims, 3 Drawing Sheets

BEARING SETTING APPARATUS

TECHNICAL FIELD

This invention relates in general to the field of spindle or axle mounted bearings, and in particular, to a procedure and apparatus for setting a bearing to a desired bearing tension.

BACKGROUND ART

Typically, mounted on a wheel axle are a pair of bearings, such as tapered roller bearings, used in rotation of the wheel. As one example, each roller bearing includes a bearing cone having an inner bearing race and a plurality of rollers, and an outer bearing race. Attached to one end of the wheel axle is a mechanism for setting the bearing adjustment.

A standard mechanism for setting the bearing adjustment includes a nut, a flat washer and a bearing lock washer interposed between the nut and the flat washer. The nut threadably engages the axle at one end securing the flat washer and the lock washer. In order to tighten the bearings, the nut is turned a predetermined number of revolutions until the rollers of the bearings exhibit a slight frictional drag when turning the wheel. Thereafter, the nut is untightened a small fraction of a turn until a locking tab of the bearing lock washer is engaged by bending into one of the many slots provided around the periphery of the nut.

With the above mechanism, automobile front wheels can operate successfully because the operating forces are sufficiently low. Many larger vehicles, such as heavy duty trucks and tractors, experience much higher forces and torques which cause the bearing cones to deflect or twist relative to the axle. This is turn causes wear of the axle and may ultimately cause failure of the bearings.

One solution to the above problem is currently achieved by carefully measuring the axial space between the bearing cones and providing a solid metal washer of slightly greater dimension which will cause the cones to be tightly clamped by the securing nut, thereby preventing relative movements and the resulting wear. However, the procedure to accomplish this selectively fitted washer is time consuming and expensive. It is particularly difficult when the bearing cones must be provided to have a diametral interference fit with the axle, often necessary as a part of the precautions to provide a tight assembly. In such cases, the outer bearing cone must be pulled off the axle with great difficulty, if the desired bearing fit is not achieved on the first trial assembly.

Therefore, a need still exists for a bearing setting procedure and apparatus which is easy to use and which will not cause damage to the axle or the bearings. A further need exists for a mechanism and procedure, which is relatively inexpensive and can be used in the continued production of numerous assemblies.

SUMMARY OF THE INVENTION

The shortcomings of the prior art are overcome and additional advantages are provided through the provision of an apparatus for adjusting a pair of bearings mounted on an axle or spindle. A first bearing has a first inner bearing race and a second bearing has a second inner bearing race. Interposed between the bearing races is an adjustable spacer. The apparatus includes a piston extension and applying means for applying pressure to the piston extension. When pressure is applied to the piston extension, the piston extension engages the first inner bearing race causing movement of the first bearing which collapses the adjustable spacer, thereby providing a desired bearing tension. Hereinafter the term bearing tension shall be used to describe the condition of axial bearing adjustment which may be either a condition of axial preload or a small predetermined axial clearance, whichever is desired for optimum bearing performance.

In another embodiment of the invention, the applying means includes a plunger located within a pressurized cylinder, such as, for instance, a hydraulic cylinder. The plunger is slidably movable to engage the piston extension.

In a further embodiment, the apparatus includes a connecting member in which the piston extension is slidably mounted on the connecting member.

In yet a further embodiment, an adapter is provided for securing the connecting member to the axle or spindle. The adapter receives the connecting member at one end and the axle at another end.

In a further embodiment of the invention, an apparatus for adjusting a pair of bearings mounted on an axle or spindle is provided. A first bearing has a first inner bearing race and a second bearing has a second inner bearing race. Interposed between the bearing races is an adjustable spacer. The apparatus includes a hydraulic cylinder having a movable plunger located therein and a hollow cavity. Positioned within the hollow cavity is a connecting member. Slidably mounted on the connecting member is a piston extension, which is engaged by the plunger when the plunger receives pressure. The pressure causes the piston extension to engage the first inner bearing race resulting in movement of the first bearing which collapses the adjustable spacer to provide a desired bearing tension.

In a further aspect of the invention, a method is provided for adjusting a pair of bearings mounted on an axle or spindle. A first bearing has a first inner bearing race and a second bearing has a second inner bearing race. Interposed between the inner bearing races is an adjustable spacer. Pressure is applied to a piston extension. The first inner race is engaged with the pressurized piston extension causing the first bearing to move which collapses the adjustable spacer to provide a desired bearing tension.

The bearing setting apparatus and method of the present invention enables a bearing to be set at a desired bearing tension with ease. The apparatus and method reduces the risk of damage to the axle or spindle and the bearings. The mechanism of the present invention enables bearings to be adjusted in a continued production line, reducing the expense associated with setting the bearing tension. This is also readily usable in field repair situations with a portable hydraulic pump, commonly available for such purposes.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

Figure 1:
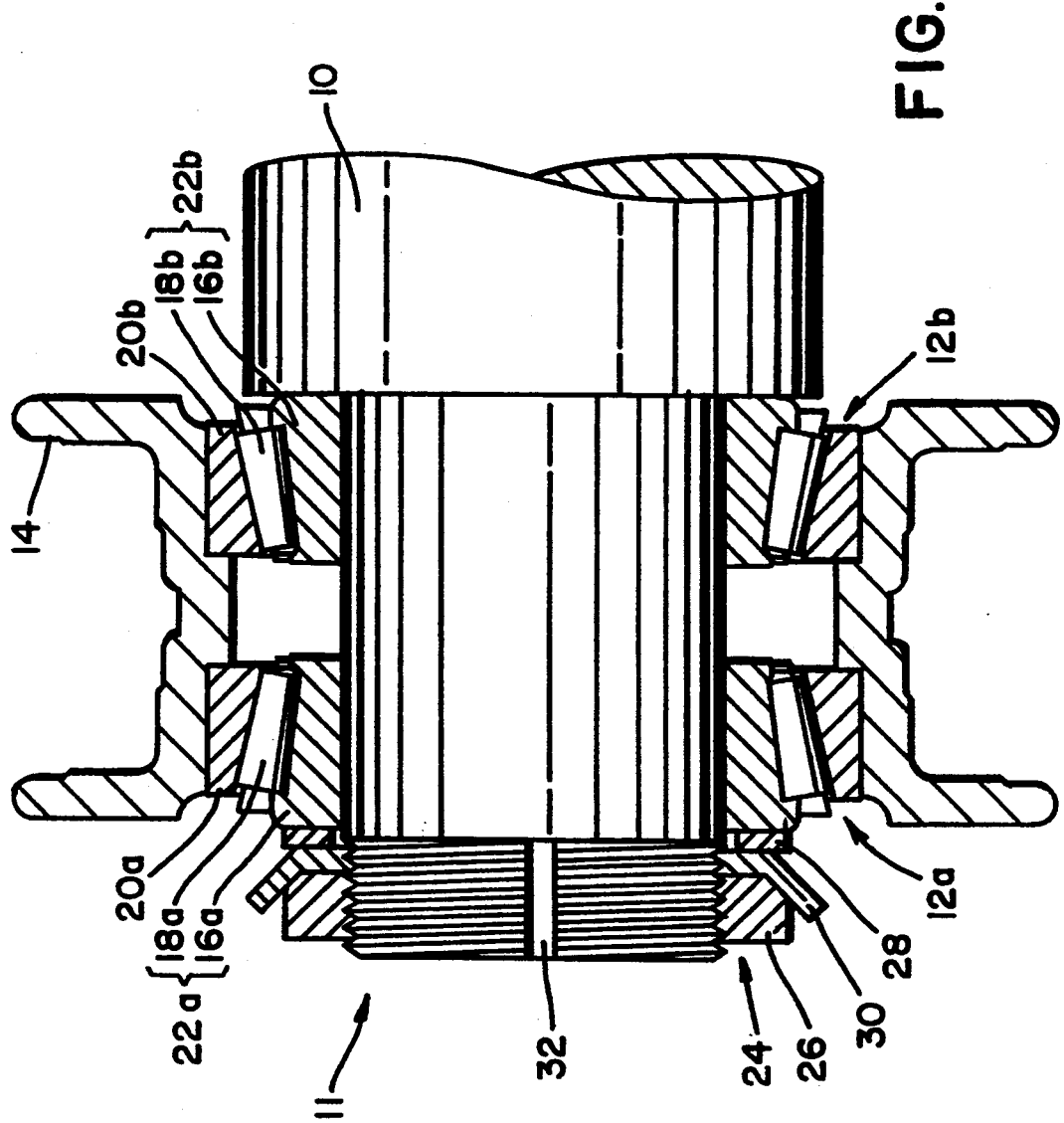
FIG. 1 depicts a partial cross-sectional view of a wheel axle or spindle with a pair of tapered roller bearings mounted thereon.

In accordance with the principles of the present invention, a bearing setting apparatus and method is provided. The apparatus and method of the present invention allows for the adjustment of a pair of bearings mounted on an axle or spindle such that a desired bearing tension is provided. With reference to FIG. 1, a typical wheel axle or spindle will be described in detail.

Referring to FIG. 1, one embodiment of a standard wheel axle 10, such as a truck wheel axle, is shown. The components described with reference to FIG. 1 are readily available in many standard sizes. In another embodiment of the invention, a typical wheel spindle may be used instead of a wheel axle. In the embodiment shown, wheel axle 10 includes a threaded end 11 and mounted on wheel axle 10 are a pair of bearings 12a and 12b, which are used to support a wheel hub 14. Each of the bearings is, for example, a tapered roller bearing. In one instance, bearing 12a includes a first inner bearing race 16a, a plurality of first rollers 18a mounted on inner bearing race 16a, and a first outer bearing race 20a mounted on rollers 18a. Similarly, bearing 12b includes a second inner bearing race 16b, a plurality of second rollers 18b mounted on inner bearing race 16b, and a second outer bearing race 20b mounted on rollers 18b. The combination of an inner bearing race and rollers is referred to as a bearing cone. Therefore, inner bearing race 16a and rollers 18a comprise a bearing cone 22a and inner bearing race 16b and rollers 18b comprise a bearing cone 22b. In one example, the bearing cones are an interference fit. Further, an outer bearing race may also be referred to as a cup.

In one example, tapered roller bearings 12a, 12b are indirectly mounted on axle 10. Indirect mounting refers to an arrangement wherein outer bearing race 20a and outer bearing race 20b face away from each other and bearing cone 22a and bearing cone 22b face towards each other.

Typically, adjustment of bearings 12a, 12b is accomplished by bringing bearing cone 22a closer to bearing cone 22b. In particular, a tightening mechanism 24 is used in order to provide the adjustment. In one embodiment, tightening mechanism 24 includes a nut 26, a flat washer 28 and a lock washer 30 interposed between nut 26 and flat washer 28. Lock washer 30 includes a locking tab (not shown) which engages a slot 32 of the threaded end 11 of axle 10 when the lock washer is tightened. Nut 26 threadably engages the axle at the threaded end in order to secure flat washer 28 and lock washer 30 to inner bearing race 16a.

Figure 2:
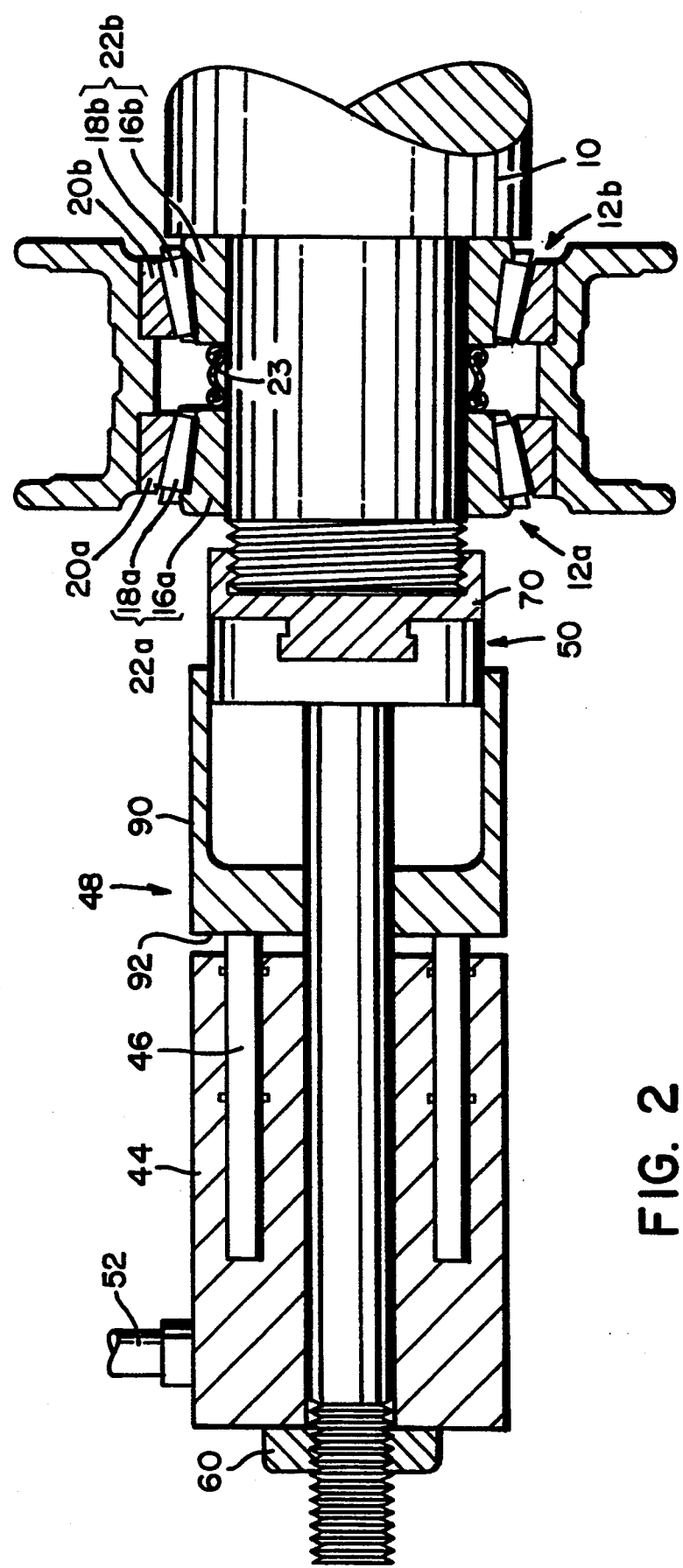
FIG. 2 depicts one embodiment of the bearing setting apparatus coupled to a wheel axle or spindle having a pair of tapered roller bearings mounted thereon and a spacer interposed between the bearings, in accordance with the principles of the present invention.

In accordance with the principles of the present invention, tightening mechanism 24 shown in FIG. 1 is removed and the bearing setting apparatus depicted in FIG. 2 is utilized in order to provide the bearing adjustment. In particular, the bearing setting apparatus of the present invention is used in order to provide a desired operating clearance of the bearings. In one instance, the desired operating clearance is a small predetermined value for optimizing the life of the bearings. Subsequent to setting the desired bearing tension, tightening mechanism 24 is attached to the threaded end of axle 10. The bearing setting apparatus is described in detail below.

Referring to FIG. 2, standard wheel axle 10 (or spindle 10, in another embodiment) is shown once again. The components of FIG. 2 which are similar to those described in detail with reference to FIG. 1 are labeled with like reference numerals. In one embodiment of the present invention, however, mounted on axle 10 is a collapsible (or adjustable) spacer 23. Collapsible spacer 23 is located between first inner bearing race 16a and second inner bearing race 16b. One embodiment of a collapsible spacer is described in detail in U.S. Pat. No. 4,067,585 issued on Jan. 10, 1978 and entitled "Deformable Metallic Element", which is incorporated herein by reference. However, the spacer used in one embodiment of the present invention is machined with a heavy wall in order to provide a heavy duty spacer to be used with larger vehicles or equipment, such as trucks and tractors. The spacer should be provided with a constant force compressibility, where the compressive force required to reduce the length of the spacer is large compared to the available axial force that could be produced by torquing nut 26 (FIG. 1). In one example, the force necessary to collapse the spacer is in the range of 20,000–50,000 pounds, which is typically held constant within ten percent of the selected force level. Such a spacer will permit nut 26 to be secured with the maximum possible torque, and therefore, the maximum possible clamping of the bearing cones, without creating difficulty in maintaining the correct bearing adjustment.

The bearing setting apparatus of the present invention includes, in one example, the following main components: a hydraulic cylinder 44 including a cylinder plunger 46, a piston extension 48 and a connecting member 50. Each of these components is described in detail below.

Hydraulic cylinder 44 includes an input port 52 for accepting hydraulic fluid used in exerting pressure on cylinder plunger 46 located within hydraulic cylinder 44 and slidably movable therein. In one embodiment, hydraulic cylinder 44 includes a hollow cavity for receiving connecting member 50.

Figure 3:
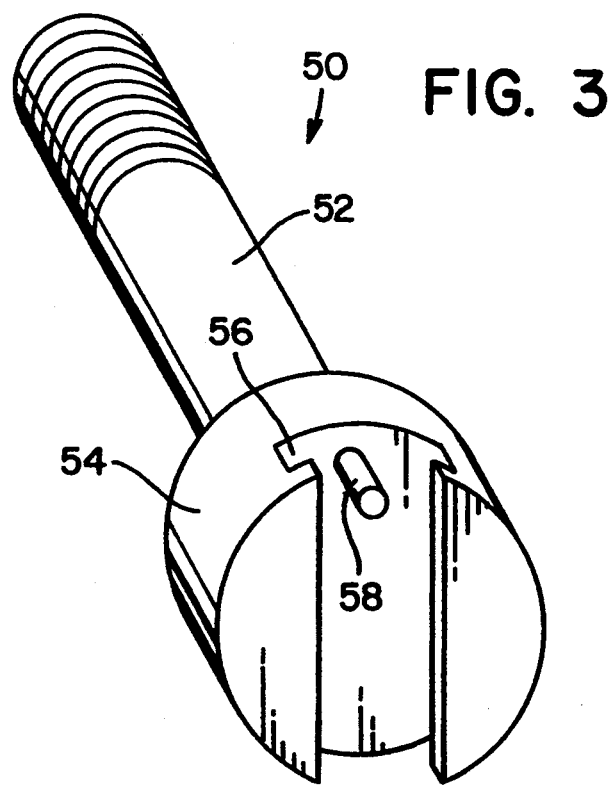
FIG. 3 depicts one example of a connecting member of the bearing setting apparatus of FIG. 2, in accordance with the principles of the present invention.

Connecting member 50 is, for example, cylindrical and is manufactured of a metal or metal alloy. Connecting member 50 includes a shaft portion 52 (FIG. 3), which is threaded at one end, and a head portion 54 located at the other end of the shaft. Head portion 54 includes a groove 56 and a pin 58 used in attaching connecting member 50 to axle 10, as described in detail below. Connecting member 50 is slidably mountable within the hollow opening of hydraulic cylinder 44 (FIG. 2). A threaded nut 60 is used to secure connecting member 50 within hydraulic cylinder 44. However, in one embodiment, connecting member 50 is capable of sliding within the hydraulic cylinder.

Figure 4:
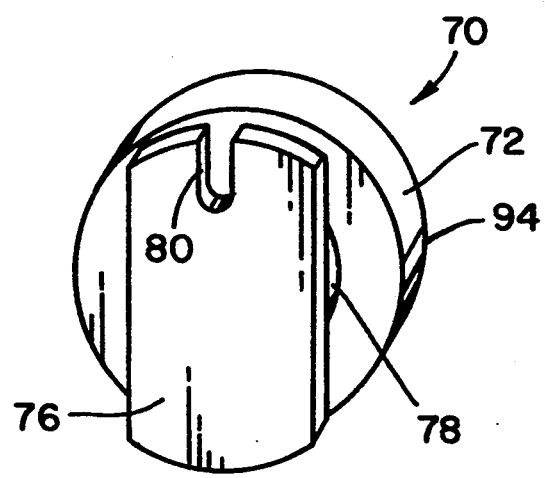
FIG. 4 illustrates one example of an adapter used in coupling the bearing setting apparatus of FIG. 2 to the wheel axle or spindle, in accordance with the principles of the present invention.

Connecting member 50 is attached to the threaded end of axle 10 by an adapter 70, thereby securing the bearing setting apparatus of the present invention to axle 10. In one embodiment, adapter 70 is separate from connecting member 50 and axle 10. The separate adapter facilitates the assembly of the adapter on the relatively fine threaded end of axle 10 without burden of the weight of the bearing setting apparatus. Adapter 70 is described in further detail with reference to FIG. 4. As one example, adapter 70 includes two members integrally machined out of one piece of steel: a cylindrically shaped member 72 having a threaded indentation at a first end 74, which is threaded for engaging adapter 70 with the threaded end of axle 10, and an extending member 76, which is positioned at a second end 78 of cylindrically shaped member 72. Extending member 76 is sized and shaped to slide into and be secured in groove 56 of connecting member 50. Extending member 76 includes a notch 80 for receiving pin 58 when extending member 76 is received by groove 56.

Returning to FIG. 2, slidably mounted on connecting member 50 is piston extension 48. Piston extension 48 is mounted on connecting member 50 prior to connecting member 50 being positioned within the hollow cavity of hydraulic cylinder 44. As described in detail below, piston extension 48 moves along connecting member 50 in order to engage inner bearing race 16a causing bearing 12a to move closer to bearing 12b collapsing spacer 23, in accordance with the principles of the present invention. Piston extension 48 is machined from a metal and has an extended horizontal member 90 extending at, for instance, a ninety degree angle from a vertical member 92. Vertical member 92 is coupled to shaft portion 52 of connecting member 50 when piston extension 48 is mounted on connecting member 50 and horizontal member 90 is coupled to head portion 54 such that member 90 can slide along the head portion to engage inner bearing race 16a, as described herein.

Using the components described above, one technique for assembling the bearing setting apparatus, in accordance with the principles of the present invention, is described in detail herein. Piston extension 48 is mounted on connecting member 50 by sliding piston extension 48 over the threaded end of connecting member 50 such that vertical member 92 contacts shaft portion 52 of the connecting member and horizontal member 90 contacts head portion 54 of the connecting member.

Subsequent to mounting the piston extension on the connecting member, the threaded end of the connecting member is slid through the hollow cavity of hydraulic cylinder 44, which has cylinder plunger 46 located therein. After the connecting member is positioned within the hydraulic cavity, threaded nut 60 is turned a number of revolutions in order to secure connecting member 50 and hydraulic cylinder 44.

In addition to the above, if tightening mechanism 24 is attached to axle 10, it is removed in a conventional manner. Thereafter, adapter 70 is threadably engaged to the threaded end of axle 10 by turning adapter 70 a number of revolutions (e.g., as one example, five or six revolutions). Subsequent to attaching adapter 70 to axle 10, the bearing setting apparatus of the present invention is secured to the axle.

In one embodiment, the bearing setting apparatus is secured by sliding head portion 54 of connecting member 50 into extending member 76 of adapter 70 such that pin 58 of the connecting member slides in and engages notch 80 of the adapter.

In operation, once the bearing setting apparatus is attached to axle 10 in the manner described above, hub 14 begins spinning and hydraulic fluid is input at input port 52 of hydraulic cylinder 44 causing the cylinder to be pressurized and to begin the bearing adjustment procedure. The pressure in cylinder 44 causes cylinder plunger 46 to move and engage piston extension 48. Piston extension 48 slides along connecting member 50 and engages first inner bearing race 16a causing bearing cone 22a to move and collapse spacer 23. By moving the bearing cone and collapsing the spacer a desired bearing tension may be achieved.

As is known in the art, desired bearing tensions for a particular vehicle or equipment, such as an automobile, truck or tractor, are provided by the manufacturer of the bearings. Different manufacturers of heavy equipment or vehicles have shown different preferences for the selection of the bearing setting from a setting with a small endplay of, for instance, 0.002 of an inch to preloaded settings that are equivalent to an axial interference fit of perhaps as much as 0.010 of an inch. One procedure for obtaining a free rolling bearing fit is to pressurize the cylinder while turning hub 14 until the first evidence of bearing roller frictional drag is observed. Spacer 23 will normally not exhibit more than about 0.003 of an inch springback or elastic recovery, as one example. Therefore, the bearing setting apparatus of the present invention may be unpressurized and removed as soon as the friction of rolling is observed and then, tightening mechanism 24 may be attached to axle 10, as described above. In one example, the maximum amount of torque applied to the nut will only reduce the spacer thickness by about 0.001 of an inch, which therefore, leaves a bearing effective clearance of approximately 0.002 of an inch.

In accordance with the principles of the present invention, it is possible to create a preload bearing setting to be used in continued production of numerous assemblies. In one example, the preload setting is accomplished by pressurizing cylinder 44 to a greater value of pressure than the constant level which is required to collapse spacer 23. The value depends upon the relative elastic properties of the bearings 12a and 12b and spacer 23, as well as any contributing resilience which may be present from the design of hub 14.

Although a preferred embodiment has been depicted and described in detail herein, it will be apparent to those skilled in the relevant art that various modifications, additions, substitutions and the like can be made without departing from the spirit of the invention and these are therefore considered to be within the scope of the invention as defined in the following claims.

I claim:

1. A bearing setting apparatus comprising:
   a connecting member having a piston extension slidably engaged thereto;
   an adapter configured to receive said connecting member at a first end and said axle or spindle at a second end securing said connecting member to an axle or spindle; and
   means for applying pressure to said piston extension wherein said piston extension translates and engages a first inner bearing race causing movement of a first bearing which collapses an adjustable spacer located between said first bearing and a second bearing to provide a desired bearing tension.

2. The apparatus of claim 1, wherein said means for applying pressure comprises a plunger located within a pressurized cylinder, said plunger being slidably movable to engage said piston extension.

3. The apparatus of claim 2, wherein said pressurized cylinder is a hydraulic cylinder.

4. The apparatus of claim 1, wherein said connecting member comprises a groove having a pin for receiving said adapter and said adapter comprises an extending member having a notch at said first end for accepting said connecting member.

5. The apparatus of claim 1, wherein said connecting member is positioned within a hollow cavity of a hydraulic cylinder having a plunger located therein, said hydraulic cylinder being pressurized causing said plunger to engage said piston extension.

6. The apparatus of claim 1, wherein said means for applying pressure comprises means for providing a relatively large compressive force to said adjustable spacer to reduce a length of said adjustable spacer.

7. An apparatus for adjusting a pair of bearings mounted on an axle or a spindle, a first bearing of said pair of bearings having a first inner bearing race and a second bearing of said pair of bearings having a second inner bearing race, interposed between said first and second inner bearing races is an adjustable spacer, said apparatus comprising:

a hydraulic cylinder having a movable plunger located therein and a hollow cavity;

a connecting member positioned within said hollow cavity of said hydraulic cylinder;

an adapter for attaching the connecting member to the axle or spindle; and a piston extension slidably mounted on said connecting member, said piston extension being engaged by said plunger when said plunger receives pressure, wherein said pressure causes said piston extension to engage said first inner bearing race resulting in movement of the first bearing which collapses said adjustable spacer to provide a desired bearing tension.

8. The apparatus of claim 7, wherein said connecting member comprises at one end a groove having a notch for receiving said adapter and said adapter comprises at a first end an extending member having a notch for accepting said connecting member and at a second end a threaded indentation for threadably engaging said axle or spindle.

9. The apparatus of claim 7, further comprising means for securing said connecting member within said hollow cavity.

* * * * *